Sept. 15, 1959  F. S. SALTER  2,904,009
THRUST-TRANSMITTING MEANS
Filed Dec. 14, 1956
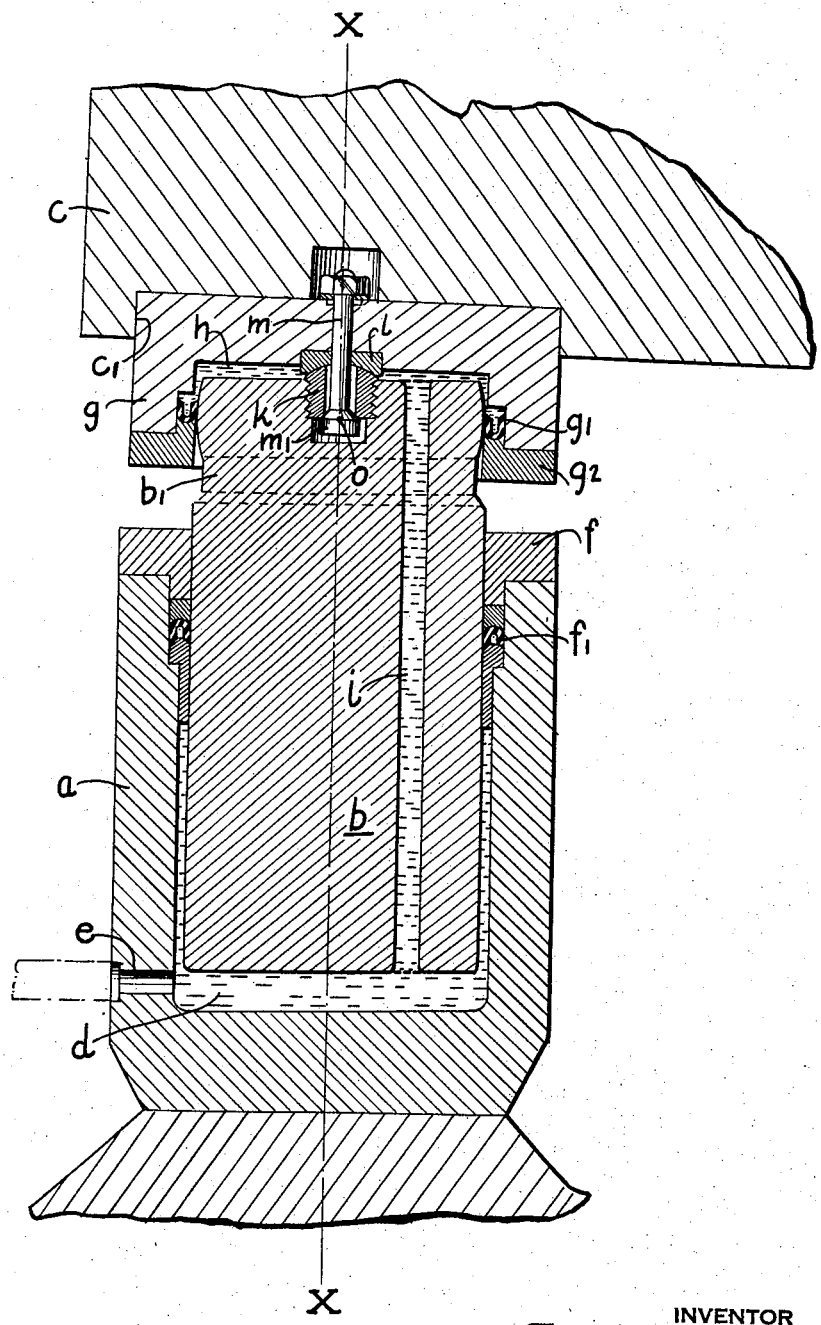
INVENTOR
Frank Sidney Salter
BY
ATTORNEYS

United States Patent Office 2,904,009
Patented Sept. 15, 1959

2,904,009

THRUST-TRANSMITTING MEANS

Frank Sidney Salter, Parkstone, England, assignor to The Loewy Engineering Company Limited, Bournemouth, England, a corporation of Great Britain Application December 14, 1956, Serial No. 628,441

Claims priority, application Great Britain December 16, 1955

13 Claims. (Cl. 121—38)

This invention relates to machines which operate with heavy working pressures, such as large hydraulic presses or other hydraulic machinery. These pressures or their reactive forces must frequently be transmitted from one element of the machine to the other under conditions such as unequal load distribution, which may lead to one of the elements being moved out of alignment with the other by imparting to that element a limited angular displacement. The problem arises then to provide between the thrust-transmitting surfaces of both elements means which enable large thrust forces to be transmitted and which permit, at the same time, one element to be moved out of alignment with the other, without undue wear on these surfaces.

This problem may occur, for instance, in those cases where hydraulic power means, comprising a cylinder and ram, are used for moving a part of a hydraulic press, such as a crosshead. The part to be moved, if subjected at the same time to lateral or eccentric loads, will have the tendency to tilt relative to the axis of the cylinder and ram; it may, thereby, impede the free movement of the ram in the cylinder, with a consequent increase of wear on those parts which are in rubbing contact with each other.

It has already been proposed to arrange between the ram of a hydraulic press, or its extension, and the part moved by the ram, such as a crosshead, separate thrust-transmitting elements in the form of pivotable thrust bearings with arcuate or spherical surfaces which are in direct metal contact with each other, whereby a limited angular displacement of the movable part relative to the axis of the ram is rendered possible. As the working pressures to be transmitted by hydraulic presses are generally large and in the order of several hundred or thousand tons, they require for their transmission, correspondingly large contact surfaces. These, if of arcuate or spherical shape, are difficult and expensive to machine. Owing to the forces to be transmitter being very large, the specific pressure between the contact surfaces of these bearings is usually very high, and their lubrication insufficient or practically non-existent. Friction between these surfaces and wear is therefore mostly very considerable. The elements formed with arcuate or spherical contact surfaces must therefore be replaced from time to time. These replacements are costly.

It is an object of the present invention to provide an improved thrust bearing through which large thrust forces can be transmitted from one element to another, while one of these elements undergoes a limited angular displacement relative to the direction of the thrust applied, without placing a strain on the other element.

The thrust-transmitting means according to the invention comprise in combination a self-aligning bearing with matching convex and concave contact surfaces of arcuate or spherical shape, and a hydraulic thrust bearing, both bearings being arranged co-axial with each other, and having a common center of pivotal movement which lies in the axis of the thrust loads, the hydraulic thrust bearing being arranged around the self-aligning bearing and having a greater load-carrying surface than the self-aligning bearing.

The self-aligning bearing takes, therefore, a smaller share of the thrust-load than the hydraulic thrust bearing, which makes it possible to reduce considerably in size the curved surfaces of that bearing against a bearing which would have to carry the entire thrust-load. The main purpose of the self-aligning bearing is to locate the hydraulic thrust bearing on the thrust-transmitting element and to stabilize the pivotal movement of the hydraulic thrust bearing.

In one form of the invention, the hydraulic thrust bearing comprises a fluid-pressure chamber formed at one end of the thrust-transmitting element and enclosed by a cup-shaped housing which has a fluid-tight fit over the end of the thrust-transmitting element and which acts like a plunger on the thrust-receiving element, while the self-aligning bearing is arranged in the center of the fluid-pressure chamber and projects from the end of the thrust-transmitting element, so as to form a support for the housing.

Preferably, the part of the thrust-transmitting element over which the housing is fitted is formed with a convex curvature, with its center coinciding with the center of the pivotal movement of the hydraulic thrust bearing and the self-aligning bearing.

The arrangement of the parts can also be reversed so that the fluid-pressure chamber is formed at one end of the thrust-receiving element and enclosed by a cup-shaped housing.

According to a further feature of the invention, means are provided for increasing the intensity of bearing pressure in the self-aligning bearing over the pressure intensity of the hydraulic thrust bearing, so as to ensure a firm contact between the load-carrying surfaces of the self-aligning bearing.

If the thrust-transmitting means according to the invention are incorporated into a hydraulic press, or other machine having hydraulic power means, the hydraulic pressure-fluid may be supplied to the hydraulic thrust bearing from the cylinder of the hydraulic power means which produce the thrust load to be transmitted.

In the accompanying drawing, an embodiment of the invention is shown. The only figure in the drawing shows in section a part of a hydraulic press in which hydraulic power means are utilized for moving a crosshead and imparting, at the same time, to the crosshead an appreciable thrust force.

The hydraulic power means shown in the drawing comprise a cylinder $a$ which is supported on a base forming part of the press and a ram $b$ which is displaceable in the cylinder $a$ for moving a crosshead $c$. The cylinder has a chamber $d$ at its end remote from the crosshead to which pressure-fluid is supplied through a port $e$. The other end of the cylinder is closed by a cover $f$ with fluid-tight sealing means $f1$, through which the ram $b$ projects with its end $b1$. The afore-described arrangement of a cylinder $a$ and ram $b$ as well as that of the thrust-transmitting means between the ram end $b1$ and the crosshead $c$, which will be presently described, is duplicated at the other end of the crosshead $c$, not shown.

A cup-shaped open housing $g$ fits with its side over the end portion $b1$, fluid-tight sealing means $g1$ being provided between the two, which are held in position by a cover $g2$. The main portion of the housing $g$ is seated in a recess $c1$ of the crosshead $c$ and is spaced-apart from the end-face of the end portion $b1$ so as to enclose a second fluid-pressure chamber $h$ of circular shape, which is co-axial with the axis X—X of the ram $b$. Pressure-fluid is supplied to the chamber $h$ from the chamber $d$ through a passageway $i$, which extends through the length of the ram $b$. The pressure-fluid in the chamber $h$ forms a hydraulic thrust bearing inside the housing $g$.

Arranged inside the fluid-pressure chamber $h$ and coaxial therewith is a self-aligning bearing which projects from the end-face of the end portion $b1$ of the ram and supports the housing $g$. The self-aligning bearing has arcuate load-bearing convex and concave contact surfaces, whose center of curvature O is located in the axis X—X of the ram $b$. These surfaces are formed on two pads $k$ and $l$ respectively, which have seats in the ram end $b1$ and in the bottom part of the housing $g$. The pad $k$ is threaded into the ram end $b1$, or secured thereto by any other means. The pad $l$ is held in position on the pad $k$ by a central bolt $m$ which passes through the housing and the two pads $k$ and $l$. The bolt has an enlarged head $m1$, which engages from below with the pad $k$, so that the housing $g$, together with the pad $l$, is attached to the ram end $b1$ and the pad $k$. The bore for the bolt $m$ in the pad $k$ has sufficient radial clearance to enable the housing $g$ to swivel about the point O. If desired, the contact surfaces between the head $m1$ and the underside of the pad $k$ can also be of arcuate shape, with the center of curvature being located at O.

The side of the ram end $b1$, which is in contact with the side-wall of the housing $g$, is outwardly curved, the center of curvature being also located at O, so that the hydraulic thrust bearing and the self-aligning bearing have a common center of pivotal movement on the axis X—X of the ram $b$.

As the housing $g$ is directly supported on the ram $b$ through the self-aligning bearing consisting of pads $k$ and $l$, a certain part of the thrust load is transmitted from the ram $b$ to the housing $g$ through the self-aligning bearing. The remainder of this load is transmitted through the pressure-fluid in the chamber $h$, with the housing $g$ acting like a plunger on the crosshead $c$. In the example shown, the load-carrying surfaces of the hydraulic thrust bearing are far greater than those in the self-aligning bearing, the preferred ratio being between five and ten to one. This makes it possible to make the self-aligning bearing much smaller than would be necessary if it was the only load-transmitting element.

Preferably, the intensity of pressure of the hydraulic thrust-bearing is below the intensity of bearing pressure in the self-aligning bearing, in order to ensure firm contact between the load-carrying surfaces of the self-aligning bearing. To this end, both the ram end $b1$ and the fluid-pressure chamber $h$ have a somewhat smaller diameter than the main part of the ram and the fluid-pressure chamber $d$. The total area available for the transmission of a thrust load is therefore smaller at the end $b1$ of the ram $b$ than at its opposite end where the chamber $d$ is situated. Since the intensity of fluid-pressure is the same in both chambers $d$ and $h$, the difference in thrust-loads transmittable through the chambers $d$ and $h$ respectively can only be made up by an increase in intensity in the bearing pressure in the self-aligning bearing, formed between the pads $k$ and $l$. The pressure intensity in the self-aligning bearing will therefore be higher than that in the hydraulic thrust-bearing.

In a practical embodiment of the invention, the cross-section of the ram $b$ is 50 sq. in., that of the reduced ram end $b1$ is 49 sq. in., and the contact area of the pads $k$ and $l$ is 5 sq. inch each, which leaves an area of 44 sq. in. for the fluid-pressure chamber $h$. Assuming that the intensity of the hydraulic pressure in the chamber $d$ and $h$ is two tons per sq. in., then the thrust-load in the ram $b$ is 100 tons, of which 88 tons are transmitted through the hydraulic thrust bearing and 12 tons through the self-aligning bearing. The intensity of pressure in the self-aligning bearing is then 2.4 tons per sq. in., which is 20% higher than the intensity of pressure in the chamber $h$. This excess in pressure intensity is sufficient to ensure a firm contact between the pads $k$ and $l$.

The invention is capable of other embodiments than the one shown in the drawing.

The hydraulic fluid used for the hydraulic thrust bearing may be water or oil of suitable viscosity. In those cases where the invention is embodied in a hydraulic press, the working fluid of the press may be utilized as the fluid for the hydraulic thrust bearing. Alternatively, the hydraulic fluid may be supplied from an independent source. An example of this are self-aligning chocks for rolling mill rolls. In this case, the hydraulic thrust bearing and the self-aligning bearing means are interposed between the chock and a screw-down spindle of the rolling mill.

The invention has the further important advantage that it provides automatically for ample lubrication of the surfaces of the self-aligning metal bearing which are in direct contact with each other. This lubrication is ensured through the surfaces of this bearing being surrounded by and immersed into the fluid-pressure chamber of a hydraulic thrust bearing.

If desired, a hydraulic relief valve may be provided in the supply line for the hydraulic pressure-fluid to the chamber $h$. This valve becomes responsive as soon as the intensity of pressure exceeds a predetermined limit so that it acts as a protecting device against overloads.

I claim:

1. A thrust-transmitting bearing between two elements subject to misalignment resulting from unequal load distribution in at least one of said elements and comprising in combination: a self-aligning pivotable hydraulic thrust bearing for transmitting the larger part of the axial load between said two elements, and another self-aligning pivotable thrust bearing having load carrying abutting and opposed surfaces transmitting the remainder of the axial load between said two elements, both said self-aligning pivotable thrust bearings being provided with a common center of pivotal movement which lies in the axis of the thrust load.

2. A thrust-transmitting bearing constructed in accordance with claim 1, wherein said hydraulic thrust bearing is provided with two unequal end surface areas subjected to the same hydraulic pressure, the smaller of said surface areas being larger than and adjacent to the surface area of said opposed and abutting surfaces of said other thrust bearing so that the bearing pressure in said hydraulic thrust bearing is smaller than the bearing pressure at said opposed and abutting surfaces of said other thrust bearing, whereby there is ensured a firm contact between said opposed and abutting surfaces of the self-aligning bearing.

3. A thrust-transmitting bearing between two elements subject to misalignment resulting from unequal load distribution in at least one of said elements and comprising in combination: a self-aligning pivotable hydraulic thrust bearing for transmitting the larger part of the axial load between said two elements, and another self-aligning pivotable thrust bearing for transmitting the remainder of the axial load between said two elements, both said thrust bearings being provided with a common center of pivotal movement which lies in the axis of the thrust load, said hydraulic thrust bearing comprising a piston mounted on one of said elements and having one end thereof provided with a convex curved side-wall, a pressure chamber provided in the other of said elements and adapted to receive said convex curved side-wall of said piston, and means for sealing pressure-fluid within the said chamber between said convex curved side-wall of said piston and said other element.

4. A thrust-transmitting bearing between two elements subject to misalignment resulting from unequal load distribution in at least one of said elements and comprising in combination: a self-aligning pivotable hydraulic thrust bearing for transmitting the larger part of the axial load between said two elements, and another self-aligning pivotable thrust bearing for transmitting the remainder of the axial load between said two elements, both said thrust bearings being provided with a common center of pivotal movement which lies in the axis of the thrust load, said hydraulic thrust bearing comprising a piston mounted on one of said elements, said other thrust bearing comprising a tubular pad having a spherical convex end mounted on said piston and a ring-like pad having a spherical concave end for seating said spherical convex end, said tubular pad having the end opposite said convex end flaring outwardly, and a bolt secured to said other element and having a head and a part spherical bearing surface adapted to abut said flaring end of said tubular pad.

5. A thrust-transmitting bearing between two elements subject to misalignment resulting from unequal load distribution in at least one of said elements and comprising in combination: a self-aligning pivotable hydraulic thrust bearing for transmitting the larger part of the axial load between said two elements, and another self-aligning pivotable thrust bearing for transmitting the remainder of the axial load between said two elements, both said thrust bearings being provided with a common center of pivotal movement which lies in the axis of the thrust load, said hydraulic thrust bearing being provided with a substantially annular chamber containing hydraulic pressure-transmitting fluid and with another substantially circular chamber of area larger than the area of said annular chamber, both said chambers being in fluid communication with each other, said other thrust bearing being provided with opposed and abutting bearing surfaces concentric with said annular chamber and of diameter at most equal to the inner diameter of said annular chamber, whereby the bearing pressure in the hydraulic thrust bearing is smaller than the bearing pressure in the other thrust bearing.

6. A thrust transmitting bearing between two elements subject to misalignment resulting from unequal load distribution in at least one of said elements and comprising in combination: a self-aligning pivotable hydraulic thrust bearing for transmitting the larger part of the axial load between said two elements, and another self-aligning pivotable thrust bearing for transmitting the remainder of the axial load between said two elements, both said thrust bearings being provided with a common center of pivotal movement which lies in the axis of the thrust load, said hydraulic thrust bearing being provided with a chamber adapted to contain hydraulic fluid and including a ram having front and rear faces with the front face of smaller area than the rear face and closing said chamber, said ram being provided with a passageway having an inlet at said rear face and an outlet at said front face and through which hydraulic fluid under pressure is supplied to said chamber.

7. A thrust bearing constructed in accordance with claim 6, wherein said other thrust bearing is provided with contacting bearing surfaces which are subjected to a higher bearing pressure than the pressure at said front face of said ram.

8. A thrust-transmitting bearing between two elements subject to misalignment resulting from unequal load distribution in at least one of said elements and comprising in combination: a self-aligning pivotable hydraulic thrust bearing for transmitting the larger part of the axial load between two said elements, and another self-aligning pivotable thrust bearing for transmitting the remainder of the axial load between said two elements, said hydraulic thrust bearing comprising a piston mounted on one of said elements and having one end thereof provided with a convex curved side-wall, a pressure chamber provided in the other of said elements and adapted to receive said convex curved side-wall end of said piston means for sealing pressure-fluid within said chamber between said convex curved side-wall of said piston end and said other element, said other thrust bearing comprising a pair of pads, one of said pads being provided with a concave curved contact surface and the other of said pads being provided with a convex contact curved surface for seating on said concave curved contact surface, all of said curved surfaces being concentric and with their center lying in the axis of the thrust load.

9. A thrust-transmitting bearing constructed in accordance with claim 8, wherein said hydraulic thrust bearing comprises a second pressure chamber provided in said other of said elements and adapted to receive the end of said piston opposite one end thereof provided with a convex curved side-wall.

10. A thrust-transmitting bearing constructed in accordance with claim 9, wherein said piston is provided with a pressure-fluid passage communicating with said pressure chambers in both said elements.

11. A thrust-transmitting bearing between two elements subject to misalignment resulting from unequal load distribution in at least one of said elements and comprising in combination: a self-aligning pivotable hydraulic thrust bearing for transmitting the larger part of the axial load between said two elements, and another self-aligning pivotable thrust bearing for transmitting the remainder of the axial load between said two elements, said hydraulic thrust bearing comprising a piston mounted on one of said elements and having one end thereof spherical segment shaped, a pressure chamber provided in the other of said elements and adapted to receive said spherical segment shaped end of said piston, means for sealing pressure-fluid within said chamber between said spherical segment shaped piston end and said other element, said other thrust bearing comprising a tubular pad having a spherical convex end mounted on said piston and a ring-like pad having a spherical concave end for seating said spherical convex end, said tubular pad having the end opposite said convex end flaring outwardly, a bolt secured to said other element and having a head and a part spherical bearing surface adapted to abut said flaring end of said tubular pad, all of said spherical surfaces being concentric and with their center lying in the axis of the thrust load.

12. A thrust-transmitting bearing constructed in accordance with claim 11, wherein said hydraulic thrust bearing comprises a second pressure chamber provided in said other of said elements and adapted to receive the end of said piston opposite said spherical shaped piston end.

13. A thrust-transmitting bearing constructed in accordance with claim 12, wherein said piston is provided with a pressure-fluid passage communicating with said pressure chambers in both said elements.

References Cited in the file of this patent

UNITED STATES PATENTS

| | | |
|---|---|---|
| 302,880 | Baumgarten | July 29, 1884 |
| 744,906 | Cowley | Nov. 24, 1903 |